United States Patent [19]

Hiraizumi

[11] Patent Number: 4,594,083

[45] Date of Patent: Jun. 10, 1986

[54] AIR CLEANER

[75] Inventor: Junichi Hiraizumi, Tokyo, Japan

[73] Assignee: Kioritz Corporation, Tokyo, Japan

[21] Appl. No.: 701,175

[22] Filed: Feb. 13, 1985

[30] Foreign Application Priority Data

Feb. 20, 1984 [JP] Japan ............................ 59-21758[U]

[51] Int. Cl.⁴ ............................................ B01D 50/00

[52] U.S. Cl. ................................ 55/385 BR; 55/498; 55/510; 55/DIG. 28; 30/381

[58] Field of Search ........... 30/381; 55/385 R, 385 B, 55/385 F, 493, 498, 510, DIG. 28; 180/219

[56] References Cited

U.S. PATENT DOCUMENTS 3,710,562 1/1973 McKinzie ......................... 55/493 X 3,722,182 3/1973 Gilbertson .................... 55/385 B X 4,483,072 11/1984 Nagashima ............................ 30/381

4,509,613 4/1985 Yamaguchi ......................... 180/219

*Primary Examiner*—Charles Hart

*Attorney, Agent, or Firm*—Sheridan Neimark

[57] ABSTRACT

An air cleaner in which an end of a flexible air intake pipe is mounted on a receiving member sealingly surrounding an intake port of a carburetor, the other end of the air intake pipe is clamped by an end portion of an air intake pipe retainer engaging with a bottom opening of a case member, a retaining claw for engaging with a frame edge of the body is formed at a bottom portion of the case member and the bottom portion of the case member is fastened by a screw at a position remote from the retaining claw.

1 Claim, 1 Drawing Figure

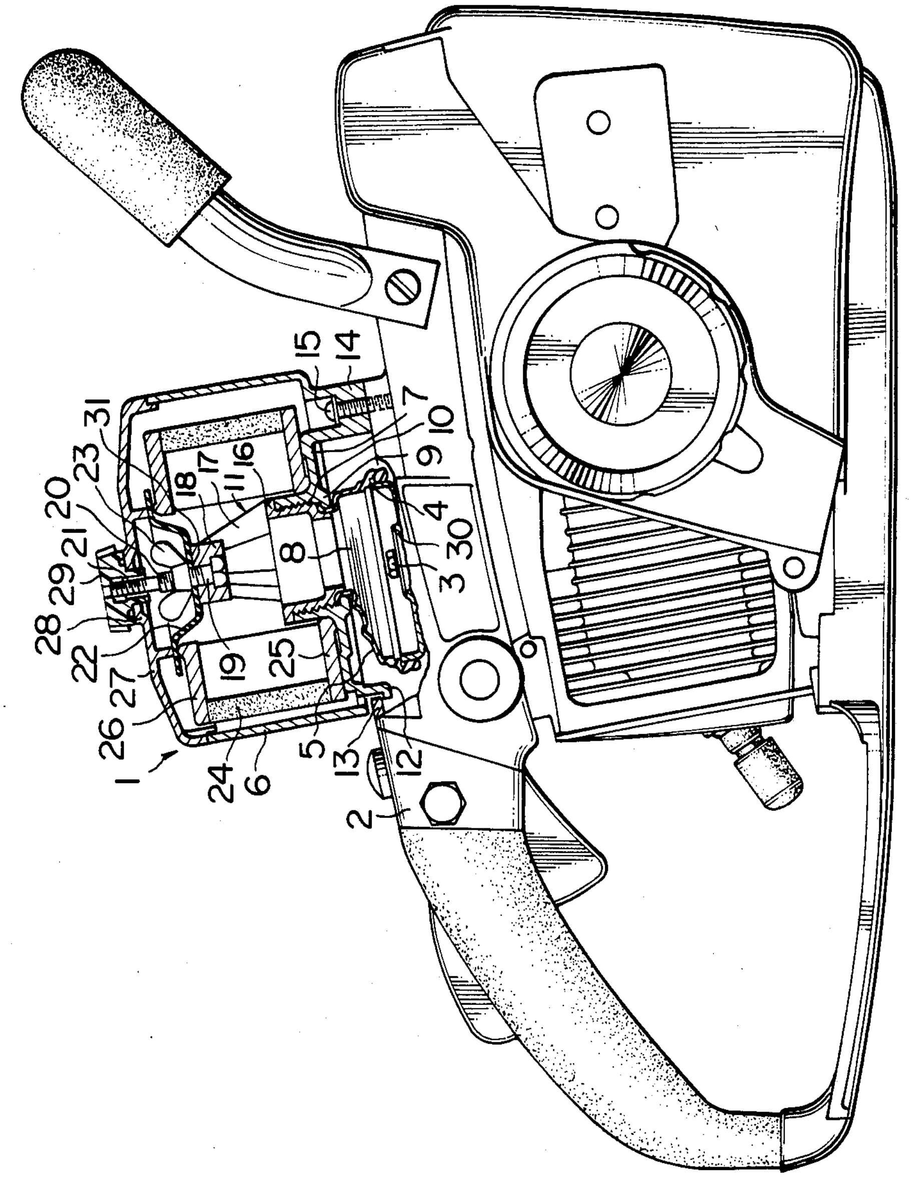
1
2
3
4
5
6
7
8
9
10
11
12
13
14
15
16
17
18
19
20
21
22
23
24
25
26
27
28
29
30
31

AIR CLEANER

BACKGROUND OF THE INVENTION

The present invention relates to an air cleaner.

For example, a chain saw is used also as an engine power cutter by replacing its toothed chain by a disc cutter. In the case where the chain saw is used as the engine power cutter, a great amount of chips or dusts are produced. It is therefore necessary to provide an air cleaner having a large physical size enough to keep a desired engine performance. However, since a conventional air cleaner is fabricated by, for example, using a relatively large number of screws, its assembling and mounting works are complicated and time-consuming. Also, in the conventional air cleaner, there is a defect that a sealing of an air passage would be incomplete to bring about a large air leakage to decrease the efficiency.

SUMMARY OF THE INVENTION

An object of the present invention is to provide an air cleaner capable of overcoming the above-mentioned defects inherent to the conventional air cleaner, and in which assembling and mounting works are simplified and air leakage is prevented with a high efficiency.

Nemely, according to the present invention, in an air cleaner in which a case member having therein an filter element and an air intake pipe retainer is mounted on a chain saw body and is communicated with an engine carburetor in the body for supplying clean air to the carburetor, an end of flexible air intake pipe is mounted on a receiving member sealingly surrounding an intake port of the carburetor, the other end of the air intake pipe is clamped by an end portion of the air intake pipe retainer engaging with a bottom opening of the case member, a retaining claw for engaging with a frame edge of the body is formed at a bottom portion of the case member, and the bottom portion of the case member is fastened by a screw at a position remote from the retaining claw.

Accordingly, with such a construction, since an air passage on the body side and an outlet port of the air cleaner are connected to each other through the flexible air intake pipe, even if the air passage and the outlet port are somewhat displaced from each other, these components may readily be coupled to each other, and at the same time, there is no air leakage. Also, since the end of the air intake pipe is pressingly clamped by the bottom of the case member and the air intake pipe retainer, the mounting work is simplified. Furthermore, since the case member is secured to the body by the retaining claw and the screw, the attachment and detachment of the air cleaner to and from the body are facilitated. Since component parts are assembled one by one, the assembling processes and inspection become simple and are positively carried out.

BRIEF DESCRIPTION OF THE DRAWING

The single figure is a cross-sectional view of a primary part of an air cleaner in accordance with the invention, mounted on a chain saw.

PREFERRED EMBODIMENT OF THE INVENTION

The present invention will now be described with reference to the single figure.

An air cleaner generally designated by reference numeral 1 includes a receiving member 4 sealingly surrounding an intake port 30 of a carburetor and fastened by a screw 3 to an upper portion of a chain saw body 2. An upper portion of the receiving member 4 is sealingly covered by a flexible air intake pipe 5 made of rubber. An upper opening edge of the air intake pipe 5 is retained at an upper portion of an inner flanged portion 9 of an opening 8 formed in the central portion of a bottom portion 7 of a case member 6. The upper opening edge of the air intake pipe 5 is sealingly clamped between the inner flanged portion 9 and a lower end of an air intake pipe retainer 11 threadably engaged with a threaded portion 10 formed in an inner periphery of the opening 8. A retaining claw 12 is formed at a peripheral edge of the bottom portion 7 of the case member 6. The retaining claw 12 is retained at a lower surface of a frame edge 13 of the body 2. A projection 14 extending downwardly is integrally formed with the bottom portion 7 on a diametrically opposite side to the location of the retaining claw 12. The case member 6 is securely mounted on the body 2 by a screw 15 passing through the projection 14 and threadably engaged with the body 2.

The air intake pipe retainer 11 is integrally composed of a sleeve-like lower end portion 16 opened upwardly and downwardly, three leg portions 17 extending upwardly from an upper end of the lower end portion 16, and an upper end boss portion 18 at upper ends of the leg portions 17. A screw member 19 extends through the upper end boss portion 18 from the lower side to the upper side. The screw member 19 is provided with a lower larger diameter threaded portion 20 and an upper smaller diameter threaded portion 21. Provided to the lower larger diameter threaded portion 20 are a dish-like disc member 22 loosely engaged therewith and a butterfly nut 23 threadably engaged therewith.

A tubular filter element 24 is arranged in an interior of the case member 6. A lower annular flanged portion 25 of the filter element 24 is disposed on an upper surface of the bottom portion 7 of the case member 6. An upper annular flanged portion 26 of the filter element 24 is retained by an outer peripheral portion of the dish-like disc member 22. Thus, the filter element 24 is firmly sealingly fastened between the bottom portion 7 of the case member 6 and the disc member 22 by fastening the butterfly nut 23 while pressing the disc member 22 downwardly. Interposed between the screw member 19 and the disc member 22 is a packing 31 such as an 0-ring to prevent dust or the like from entering from the outside.

An open upper end of the case member 6 is closed by a cover 27. The upper smaller diameter threaded portion 21 of the screw member 19 passes through a bore of a central bose portion 28 of the cover 27 and projects to the outside. A nut 29 is threadably engaged with the projecting end of the upper smaller diameter portion 21 to thereby press the outer peripheral portion of the cover 27 against the upper portion of the case member 6.

Air introduced from and around the bottom portion 7 of the case member 6 into the case member 6 will pass radially inwardly through the filter element 24, and further flow downwardly through the opening of the lower end portion 16 of the air itake pipe retainer 11 to enter into a space defined by the air intake pipe 5 and the receiving member 4 to be finally fed to a carburetor of an engine therefrom.

What is claimed is:

1. An air cleaner in which a case member having therein an filter element and an air intake pipe retainer is mounted on a power machine body and is communicated with an engine carburetor in the body for supplying clean air to the carburetor, said air cleaner characterized in that an end of a flexible air intake pipe is mounted on a receiving member sealingly surrounding an intakeport of the carburetor, the other end of the air intake pipe is clamped by an end portion of the air intake pipe retainer engaging with a bottom opening of the case member, a retaining claw for engaging with a frame edge of the body is formed at a bottom portion of the case member, and said bottom portion of said case member is fastened by a screw at a position remote from said retaining claw.

* * * * *